June 27, 1939.  D. BLUNT  2,163,726
AGRICULTURE MACHINE
Filed May 16, 1938   2 Sheets-Sheet 1

Inventor
Desco Blunt
By Clarence A. O'Brien
and Hyman Berman
Attorneys

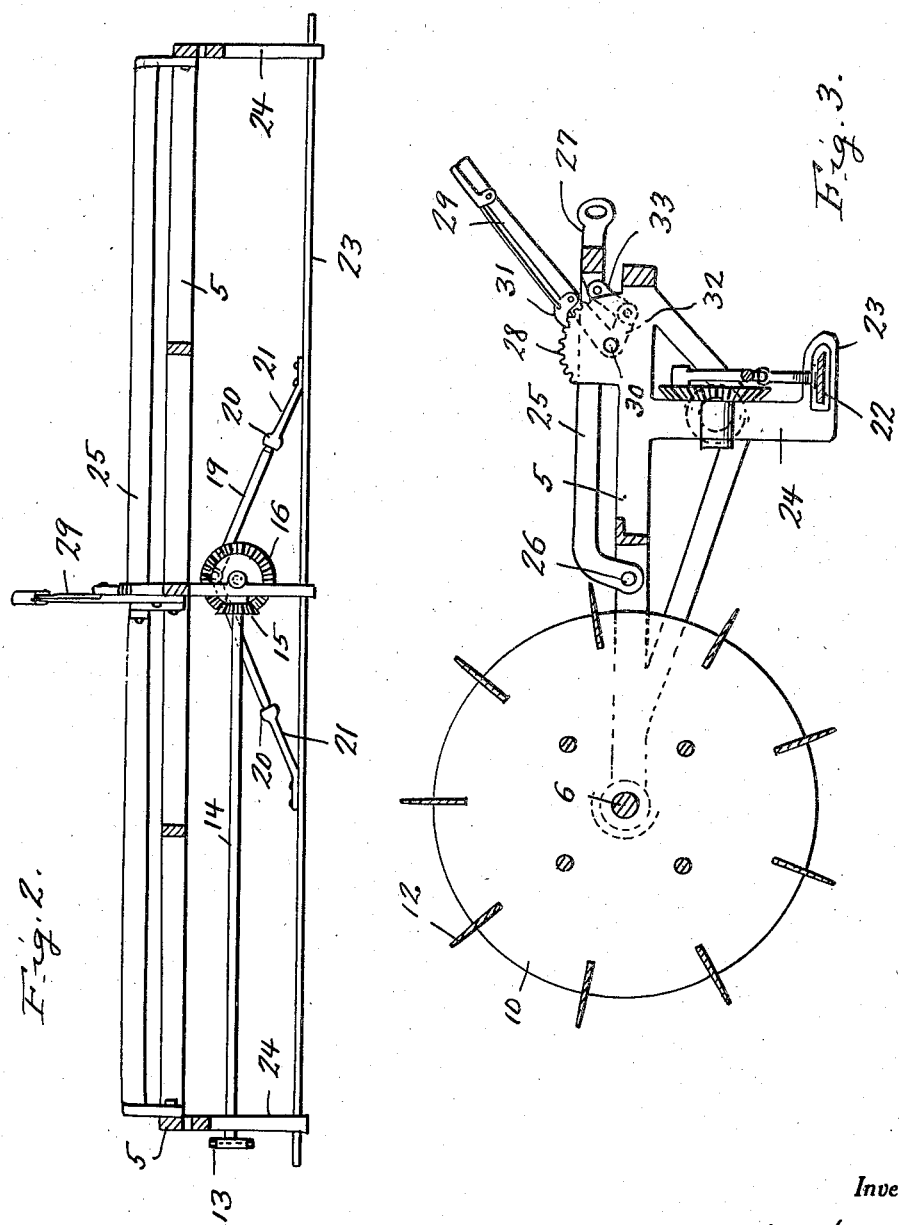

Patented June 27, 1939

2,163,726

UNITED STATES PATENT OFFICE 2,163,726

AGRICULTURE MACHINE

Desco Blunt, Venango, Nebr.

Application May 16, 1938, Serial No. 208,261

2 Claims. (Cl. 97—44)

This invention appertains to new and useful improvements in machines for agriculture and more particularly to a machine which has the combination advantage of cutting weeds, mulching the soil, semi-packing, and ridging or damming the soil.

In addition to the above advantages or objects the machine is positive acting, of simple design and not susceptible to the ready development of defects.

These and various other important objects and advantages of the invention will become apparent to the reader of the following specification.

In the drawings:—

Figure 2 is a section on the line 2—2 of Figure 1.

Figure 3 is a section on the line 3—3 of Figure 1.

Figure 1:
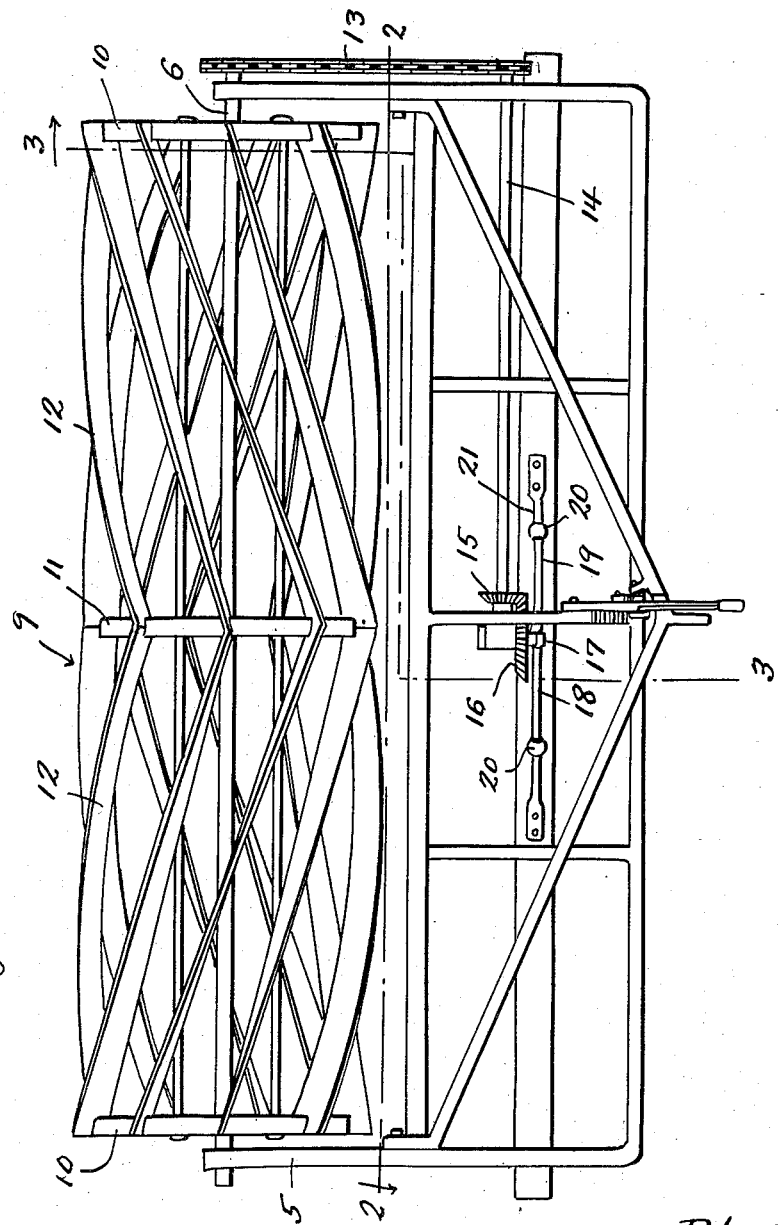
Figure 1 represents a top plan view of the machine.

Referring to the drawings wherein like numerals designate like parts, it can be seen that numeral 5 represents a U-shaped frame through the rear ends of which is disposed the shaft 6 to which the reel generally referred to by numeral 9 is attached. This reel consists of the two end disks 10—10 and the intermediate disk 11. The intermediate disk is provided at its periphery with notches for receiving the end portions of the blades 12, these blades extending toward the end disks 10 in a direction obliquely with respect to the axle 6. In other words, a herring-bone form of soil treatment will well mulch the soil.

One end of the axle or shaft 6 is provided with a sprocket over which the chain 13 is trained, this chain being also trained over the sprocket on the shaft 14. This shaft is journaled through one leg of the frame 5 and through one of the brace members and has a pinion gear 15 of the beveled type meshing with the beveled gear 16, one side of which is provided with the formation 17 to which the rods 18—19 are connected, these rods 18—19 being in turn connected by ball and socket connections 20 to the arms 21 rising upwardly from the horizontally reciprocatory sub-soil blade 22 which is operative through the foot portion 23 of the legs 24 which depend from the forward portion of the frame 5.

Numeral 25 represents a V-shaped frame having its end portions pivotally connected as at 26 to the frame 5 while its forward apex portion is provided with the apertured draft line connecting extension 27.

Rising from the forward portion of the frame 5 is the quadrant gear 28 to which the hand bar 29 is pivotally secured as at 30. A detent 31 on the hand bar 29 is cooperative with the gear 28. The lower portion of the hand bar 29 is provided with the arm 32 which is connected by the pivotal link 33 to the apex portion of the draft frame 25. Obviously, by adjusting the hand bar 29, the sub-soil blade 22 can be raised and lowered in the soil.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

1. An agriculture machine of the character described comprising a frame, a rotatable reel mounted on the rear portion of the frame, and a sub-soil blade mounted on the forward portion of the frame, and means for horizontally reciprocating the said sub-soil blade.

2. An agriculture machine of the character described comprising a frame, a rotatable reel mounted on the rear portion of the frame, and a sub-soil blade mounted on the forward portion of the frame, and drive means between the reel and the sub-soil blade whereby the sub-soil blade can be horizontally reciprocated.

DESCO BLUNT.